US007660351B2

(12) United States Patent
Varma et al.

(10) Patent No.: US 7,660,351 B2
(45) Date of Patent: Feb. 9, 2010

(54) VIDEO DEBLOCKING

(75) Inventors: Ankur Varma, San Francisco, CA (US); Shankar Moni, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 11/191,204

(22) Filed: Jul. 27, 2005

(65) Prior Publication Data

US 2005/0262531 A1   Nov. 24, 2005

Related U.S. Application Data

(62) Division of application No. 10/179,825, filed on Jun. 24, 2002, now abandoned.

(51) Int. Cl.
*H04N 7/12* (2006.01)
*G06K 9/48* (2006.01)
(52) U.S. Cl. .................................. 375/240.03; 382/200
(58) Field of Classification Search ............ 375/240.03; 382/200, 158, 232, 233, 298
See application file for complete search history.

(56) References Cited

U.S. PATENT DOCUMENTS

| 5,142,592 | A | * | 8/1992 | Moler ......................... 382/200 |
| 5,446,804 | A | * | 8/1995 | Allebach et al. ............ 382/298 |
| 5,512,956 | A | | 4/1996 | Yan |
| 5,548,662 | A | * | 8/1996 | Kwon ......................... 382/158 |
| 5,661,824 | A | * | 8/1997 | Allebach et al. ............ 382/298 |
| 5,668,598 | A | | 9/1997 | Linzer et al. |
| 5,684,894 | A | * | 11/1997 | Shustorovich .............. 382/232 |
| 5,796,875 | A | | 8/1998 | Read |
| 5,802,213 | A | | 9/1998 | Gardos |
| 5,805,221 | A | | 9/1998 | Lee |
| 5,850,294 | A | | 12/1998 | Apostolopoulos et al. |
| 5,852,475 | A | | 12/1998 | Gupta et al. |
| 5,903,673 | A | | 5/1999 | Wang et al. |

(Continued)

FOREIGN PATENT DOCUMENTS

EP      381067 A2  *  8/1990

OTHER PUBLICATIONS

Al-Fahoum, Amjed S., "Combined Edge Crispness and Statistical Differencing for Deblocking JPEG Compressed Images", IEEE Transactions of Image Processing, vol. 10, No. 9, Sep. 2001, pp. 1288-1298.

(Continued)

*Primary Examiner*—Gims S Philippe
(74) *Attorney, Agent, or Firm*—Lee & Hayes, PLLC

(57) ABSTRACT

Video deblocking can be implemented in video content processing and delivery environments when displaying decompressed/decoded video information. Discontinuities are identified and smoothed to reduce blockiness, for example at macroblock boundaries in conjunction with Moving Picture Expert Group (MPEG)-based schemes. In exemplary implementation(s), a client device detects discontinuities at or near block boundaries, determines which discontinuities are artificial, and smooths at least those discontinuities that are determined to be artificial. These actions may be accomplished using (i) one or more Laplacian of Gaussian (LoG) operations as applied to both an image and a quantization matrix and (ii) windowed comparisons between values and a threshold resulting from the LoG operations. Alternatively, these actions may be accomplished using a spatio-temporally varying filter. Additionally, in an MPEG context, intra image units may be deblocked using the former approach while non-intra image units may be deblocked using the latter approach.

20 Claims, 12 Drawing Sheets

U.S. PATENT DOCUMENTS

| | | |
|---|---|---|
| 5,920,356 A | 7/1999 | Gupta et al. |
| 5,995,080 A | 11/1999 | Biro et al. |
| 6,014,693 A | 1/2000 | Ito et al. |
| 6,040,861 A | 3/2000 | Boroczky et al. |
| 6,104,434 A | 8/2000 | Nakagawa et al. |
| 6,178,205 B1 | 1/2001 | Cheung et al. |
| 6,181,742 B1 | 1/2001 | Rajagopalan et al. |
| 6,278,735 B1 | 8/2001 | Mohsenian |
| 6,281,942 B1 | 8/2001 | Wang |
| 6,285,801 B1 | 9/2001 | Mancuso et al. |
| 6,320,905 B1 | 11/2001 | Konstantinides |
| 6,373,482 B1 | 4/2002 | Migdel et al. |
| 6,449,255 B1 | 9/2002 | Waclawsky |
| 6,504,873 B1 | 1/2003 | Vehvilainen |
| 6,539,060 B1 | 3/2003 | Lee et al. |
| 6,611,503 B1 | 8/2003 | Fitzgerald et al. |
| 6,665,346 B1 | 12/2003 | Lee et al. |
| 6,668,095 B2 | 12/2003 | Rackett |
| 6,690,838 B2 | 2/2004 | Zhou |
| 6,728,414 B1 | 4/2004 | Chang et al. |
| 6,816,166 B2 | 11/2004 | Shimizu et al. |
| 6,898,321 B1 | 5/2005 | Knee et al. |
| 6,950,473 B2 | 9/2005 | Kim et al. |
| 6,963,613 B2 | 11/2005 | MacInnis et al. |
| 6,983,079 B2 | 1/2006 | Kim |
| 6,996,285 B2 | 2/2006 | Unruh et al. |
| 7,003,174 B2 | 2/2006 | Kryukov et al. |
| 7,031,392 B2 | 4/2006 | Kim et al. |
| 7,120,197 B2 | 10/2006 | Lin et al. |
| 7,227,901 B2 | 6/2007 | Joch et al. |
| 2001/0019634 A1 | 9/2001 | Lainema et al. |
| 2002/0159096 A1 | 10/2002 | Sun et al. |
| 2003/0035586 A1* | 2/2003 | Chou et al. .................. 382/233 |
| 2003/0058944 A1 | 3/2003 | MacInnis et al. |

OTHER PUBLICATIONS

Chou, Jim et al., "A Simple Algorithm For Removing Blocking Artifacts in Block-Transform Coded Images", University of Illinois at Urbana-Champaign, Dept. of Electrical and Computer Engineering; Sep. 27, 1997, 10 pages.

Chou, Jim, "A Simple Algorithm for Removing Blocking Artifacts in Block-Transform Coded Images", IEEE Signal Processing Letters, vol. 5, No. 2, Feb. 1998, pp. 33-35.

Sung, Duek Kim, et al., "A Deblocking Filter with Two Separate Modes in Block-Based Video Coding", IEEE Transactions on Circuits and Systems for Video Technology, vol. 9, No. 1, Feb. 1999, pp. 156-160.

Wang, Qiu-Hong, "Reduction of Blocking Artifacts in Real Time Video Compression". Mini-Micro System, vol. 22, No. 6, Jun. 2001, 5 pages, Including English-language Abstract.

\* cited by examiner

| GOP POSITION NUMBER (GPN): | 1 | 2 | 3 | 4 | 5 | ••• | n-1 | n |
|---|---|---|---|---|---|---|---|---|
| MPEG FRAME: | I | B | B | B | P | ••• | B | B |
| $\alpha 1$: | $\frac{(n-1)+1}{n}$ | $\frac{(n-2)+1}{n}$ | $\frac{(n-3)+1}{n}$ | $\frac{(n-4)+1}{n}$ | $\frac{(n-5)+1}{n}$ | ••• | $\frac{2}{n}$ | $\frac{1}{n}$ |
| $\alpha 2$: | $\frac{1}{1}$ | $\frac{1}{2}$ | $\frac{1}{3}$ | $\frac{1}{4}$ | $\frac{1}{5}$ | ••• | $\frac{1}{(n-1)}$ | $\frac{1}{n}$ |
| $\alpha 3$: | $\frac{1}{1^2}$ | $\frac{1}{2^2}$ | $\frac{1}{3^2}$ | $\frac{1}{4^2}$ | $\frac{1}{5^2}$ | ••• | $\frac{1}{(n-1)^2}$ | $\frac{1}{n^2}$ |

FIG. 13A

| $\alpha$ | GENERAL GPN-DEPENDENT MODIFIER |
|---|---|
| $\alpha 1$ | $\frac{(n-GPN)+1}{n}$ |
| $\alpha 2$ | $\frac{1}{GPN}$ |
| $\alpha 3$ | $\frac{1}{GPN^2}$ |

FIG. 13B

VIDEO DEBLOCKING

RELATED PATENT APPLICATION

This U.S. Nonprovisional Patent Application is a Divisional Application of co-pending U.S. Nonprovisional patent application Ser. No. 10/179,825, filed on Jun. 24, 2002, and entitled "Video Deblocking". Application Ser. No. 10/179,825 is hereby incorporated by reference in its entirety herein.

TECHNICAL FIELD

This disclosure relates in general to video deblocking and in particular, by way of example but not limitation, to post-processing of video information to reduce blockiness in the display thereof.

BACKGROUND

Television-based entertainment systems are expanding the programming and services that they offer. In addition to television program content such as that found on broadcast and traditional cable networks, television service providers are adding on-demand video, as well as other interactive services, features, and applications. Such content and additional information are downloaded over a network for display, use, and/or storage on client-side set-top boxes or similar devices. Because of bandwidth constraints, downloads that include audio and/or video information, for example, are transmitted in a coded or compressed format. In other words, to reduce the amount of data that is transmitted, the information is typically compressed from a first size to a second smaller size.

After the compressed/coded data is transmitted, the data is decompressed/decoded into a semblance of the original audio and video information. Unfortunately, because the compression-decompression cycle is typically lossy, the decompressed version of the audio and video information differs from the original version of the audio and video information. With video information, for example, such differences can result in the presentation quality of the video information being visibly decreased.

Accordingly, for television-based entertainment systems, there is a need for schemes and techniques to enable post-processing improvements to video information that has been adulterated in a compression-decompression cycle.

SUMMARY

Video deblocking can be implemented in video content processing and delivery environments when displaying decompressed/decoded video information. Discontinuities are identified and smoothed to reduce blockiness, for example at macroblock boundaries in conjunction with Moving Picture Expert Group (MPEG)-based schemes. In exemplary implementation(s), a client device detects discontinuities at or near block boundaries, determines which discontinuities are artificial, and smooths at least those discontinuities that are determined to be artificial. These actions may be accomplished using (i) one or more Laplacian of Gaussian (LoG) operations as applied to both an image and a quantization matrix and (ii) windowed comparisons between values and a threshold resulting from the LoG operations. Alternatively, these actions may be accomplished using a spatio-temporally varying filter. Additionally, in an MPEG context, intra image units may be deblocked using the former approach while non-intra image units may be deblocked using the latter approach.

BRIEF DESCRIPTION OF THE DRAWINGS

The same numbers are used throughout the drawings to reference like and/or corresponding aspects, features, and components.

FIGS. 13A and 13B illustrate an exemplary approach for indirectly deblocking video using temporal filtering across multiple frames of a GOP.

DETAILED DESCRIPTION

The following discussion is directed to video content processing and delivery systems, such as interactive TV networks, cable/satellite networks that utilize electronic program guides and other applications, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes and personal digital assistants (PDAs) or mobile phones. However, video deblocking as described herein may additionally be used in other environments such as in streaming (e.g., over the Internet), generally in post-processing of compression and decompression cycles, and so forth. While aspects of the described systems and methods can be used in any of these environments and for any types of client devices, they are described primarily in the context of the following exemplary environment.

Exemplary System Architecture

Figure 1:
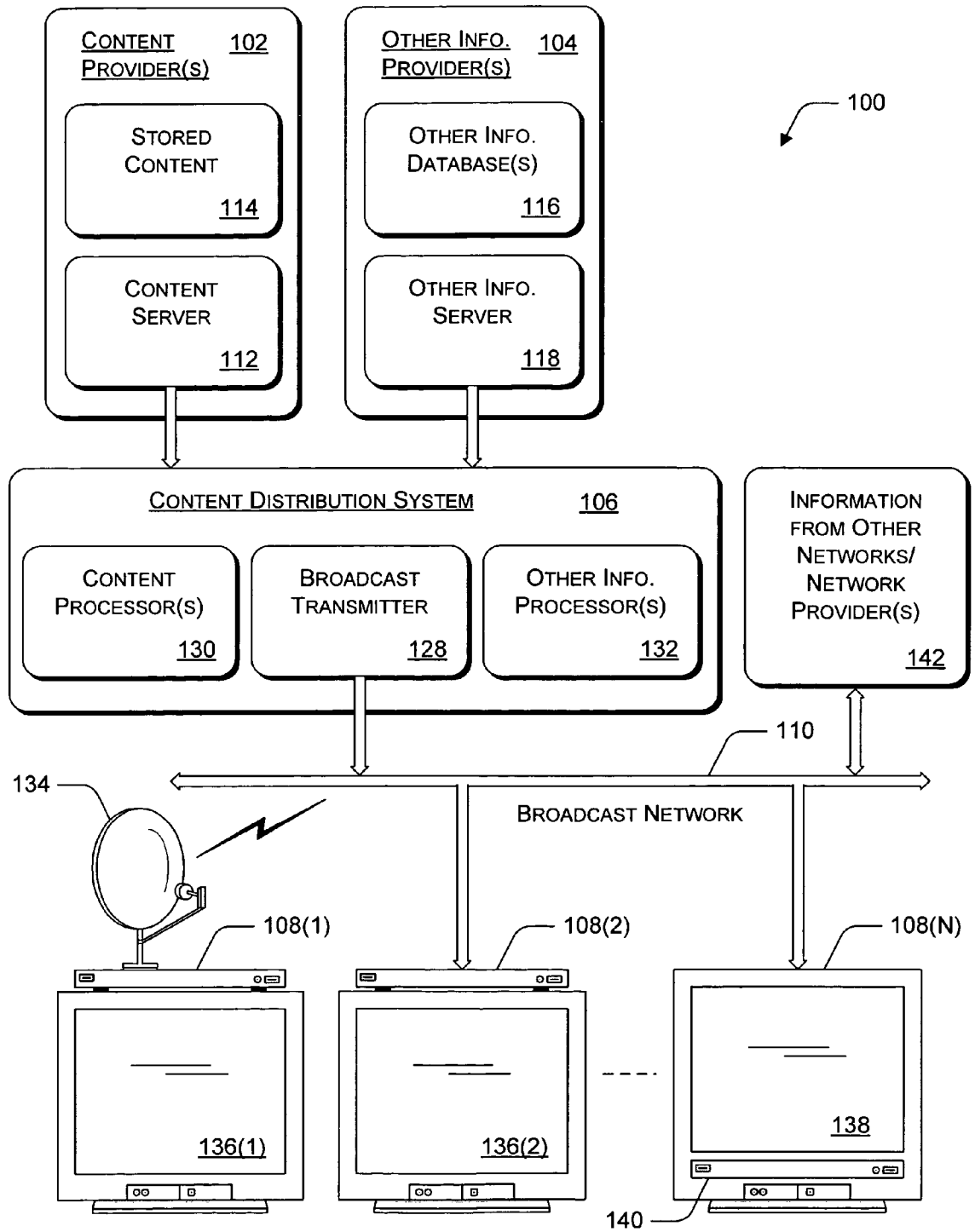
FIG. 1 illustrates an exemplary television system architecture in which the systems and methods for video deblocking can be implemented.

FIG. 1 illustrates an exemplary television entertainment system 100 that is an architecture in which video deblocking may be implemented. System 100 facilitates distribution of content and other information to multiple viewers. System 100 includes one or more content providers 102, one or more other information providers 104, a content distribution system 106, and multiple client devices 108(1), 108(2), ..., 108(N) coupled to content distribution system 106 via a broadcast network 110.

Content provider 102 includes a content server 112 and stored content 114, such as movies, television programs, commercials, music, and similar audio and/or video content. Content server 112 controls distribution of stored content 114 from content provider 102 to content distribution system 106. Additionally, content server 112 may control distribution of live content (e.g., content that was not previously stored, such as live feeds) and/or content stored at other locations to content distribution system 106.

Other information provider 104 includes other information database 116 and other information server 118. Other information database 116 stores information that may be provided to client devices 108. Such information includes software modules, files, images, text, executable programs, moving video, gaming or other interactive information, and so forth. The information may also include content, especially content of an irregular, one-of-a-kind, or similar nature, or content from smaller independent providers. Part or all of the information from other information database 116 may ultimately be displayed to subscribers after traversing one or more low-bandwidth transmission mediums, regardless of whether such transmission medium(s) are located upstream or downstream of content distribution system 106. Other information server 118 processes the other information from other information database 116 prior to distribution to generate one or more files that are optimized for, or at least capable of, transmission to content distribution system 106.

Content distribution system 106 includes a broadcast transmitter 128, one or more content processors 130, and one or more other information processors 132. Broadcast transmitter 128 can alternatively be a transceiver if bi-directional communication is desired (e.g., in situations in which broadcast network 110 is a bidirectional network 110). Broadcast transmitter 128 transmits (e.g., broadcasts) signals, such as cable/satellite television signals, across broadcast network 110. Broadcast network 110 can include a cable television network, RF, microwave, satellite, and/or data network, such as the Internet, and may also include wired or wireless media using any transmission format or protocol. Additionally, broadcast network 110 can be any type of network (including a bidirectional network), using any type of network topology and any network communication protocol, and can be represented or otherwise implemented as a combination of two or more networks.

Content processor 130 processes the content received from content provider 102 prior to transmitting the content across broadcast network 110. Similarly, other information processor 132 processes the other information that is received from other information provider 104 prior to transmission of the other information across broadcast network 110. A particular content processor 130 may encode, or otherwise process, the received content into a format that is understood by the multiple client devices 108(1), 108(2), ..., 108(N) that are coupled to broadcast network 110. Although FIG. 1 shows a single content provider 102, a single other information provider 104, and a single content distribution system 106, the exemplary system 100 can include any number of content providers and/or other information providers coupled to any number of content distribution systems. Thus, content distribution system 106, content provider 102, and/or other information provider 104 are individually or jointly representative of a headend service that provides content and other information to multiple subscribers.

Client devices 108 can be implemented in a number of ways. For example, a client device 108(1) receives content and other information from a satellite-based transmitter via a satellite dish 134. Client device 108(1) is also referred to as a set-top box or a satellite receiving device. Client device 108(1) is coupled to a television 136(1) for presenting the content and other information (e.g., audio information, video information, and/or data information) that are received by the client device 108(1), as well as for presenting a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive content and other information from broadcast network 110 and to provide the received content and other information to associated television 136(2). Client device 168(N) is an example of a combination television 138 and integrated set-top box 140. In this example, the various components and functionality of the set-top box are incorporated into the television, rather than using two separate devices. Set-top box 140 that is integrated into television 138 can receive signals (e.g., broadcast signals) via a satellite dish (similar to satellite dish 134) and/or directly via broadcast network 110. In alternate implementations, client devices 108 may receive signals via the Internet or any other network, especially those network mediums that are broadcast-capable. As is further described below, client devices 108 may also engage in video deblocking prior to displaying video information (whether content video information or other video information) that is received from a low bandwidth medium, such as a memory storage, other client devices, possibly broadcast network 110 itself, and so forth.

The exemplary system 100 also includes information from other networks/network providers 142, which may provide information such as information streamed over the Internet, information received directly from a provider of the information, and so forth. Information from other networks/network providers 142 may be accessible over broadcast network 110 (i.e., a network that also provides content information and other information from content distribution system 106). Alternatively, information from other networks/network providers 142 may be accessible over a different network, including a wide area network (WAN), the Internet, a public or private telecommunications network, and so forth.

Exemplary Client Device

Figure 2:
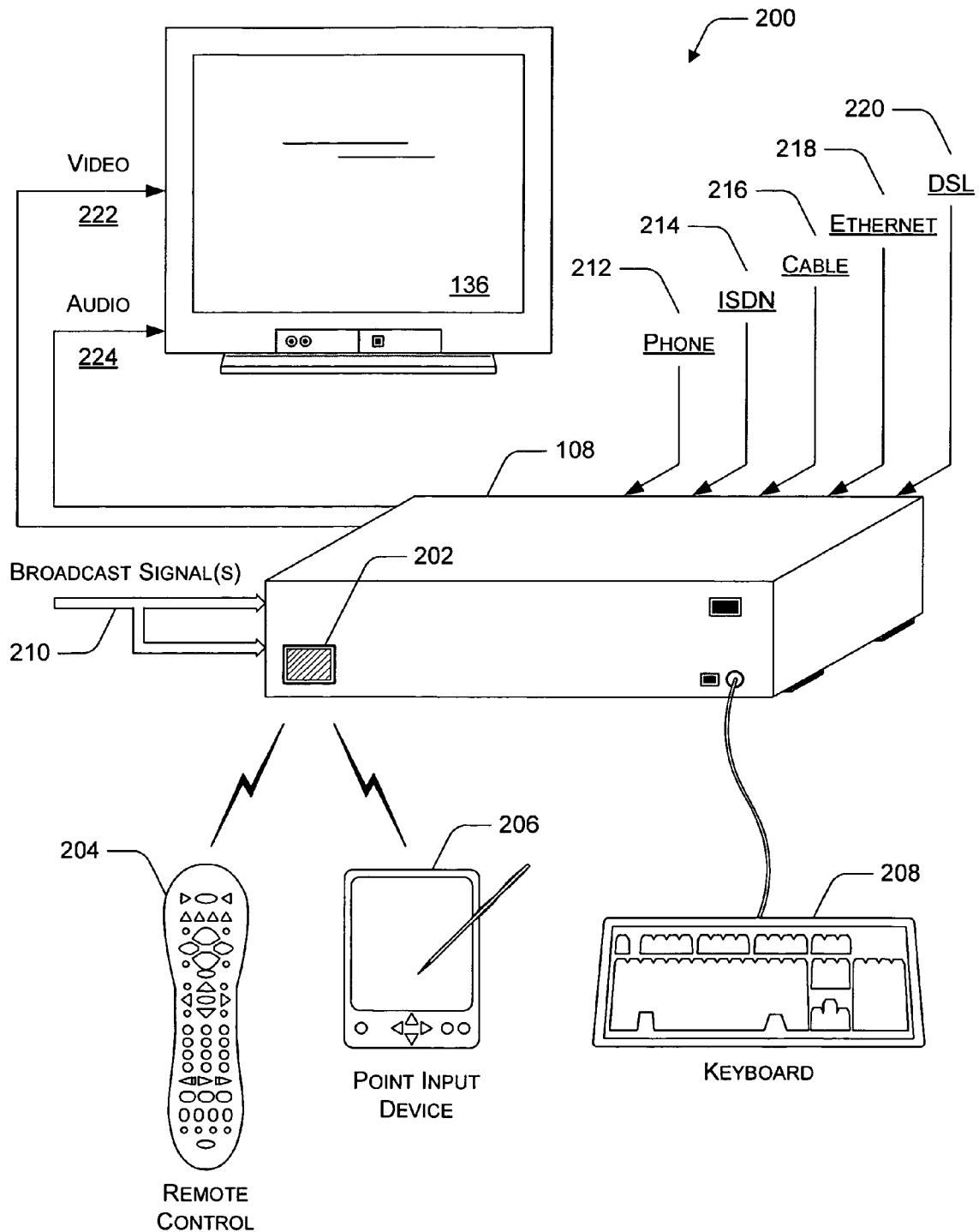
FIG. 2 illustrates an exemplary client device, a television, and various input devices that interact with the client device.

FIG. 2 illustrates an exemplary implementation 200 of a client device 108 shown as a standalone unit that connects to a television 136 and communicates with various input devices 204, 206, and 208. Client device 108 can be implemented in any number of embodiments, including as a set-top box, a satellite receiver, a TV recorder with a hard disk, a digital video record (DVR) and playback system, a game console, an information appliance, and so forth.

Client device 108 includes a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more (e.g., broadcast) signals 210 from one or more broadcast sources, such as from a satellite or a cable or a broadcast network, including a broadcast implementation of network 110 (of FIG. 1). Client device 108 includes hardware and/or software for receiving and decoding a broadcast signal 210, such as an NTSC, PAL, SECAM or other TV system video signal. Client device 108 also includes hardware and/or software for providing the user with a graphical user interface by which the user can, for example, access various network services, configure client device 108, and perform other functions, including requesting video delivery.

Client device 108 can communicate with other devices via one or more connections including a conventional telephone line 212, an ISDN link 214, a cable link 216, an Ethernet link 218, a DSL link 220, and the like. Client device 108 may use any one or more of the various communication links 212-220 at a particular instant to communicate with any number of other devices. For example, in addition to receiving information over any one of communication links 212-220, client device 108 may provide (e.g., transmit) information over communication links 212-220 or any other type of communication link. Such other communication links may include links capable of interfacing with a local network such as a local area network (LAN), a Bluetooth® network, an IEEE 802.11b-compliant network, or other wired or wireless network type. In such a local network environment, a client device 108 that receives information from broadcast network 110 may forward the information over the local network to one or more other client devices 108. The forwarding may be effectuated, for example, over a lower-bandwidth transmission medium that introduces blockiness.

Client device 108 generates video signal(s) 222 and audio signal(s) 224, both of which are communicated to television 136. Video signals 222 and audio signals 224 can be communicated from client device 108 to television 136 via an RF (radio frequency) link, S-video link, composite video link, component video link, co-axial cable link, or other communication link. The video signals 222 may include deblocked video signals, for example. Although not shown in FIG. 2, client device 108 may include one or more lights or other indicators identifying the current status of the device. Additionally, the client device may include one or more control buttons, switches, or other selectable controls for controlling operation of the device.

Figure 3:
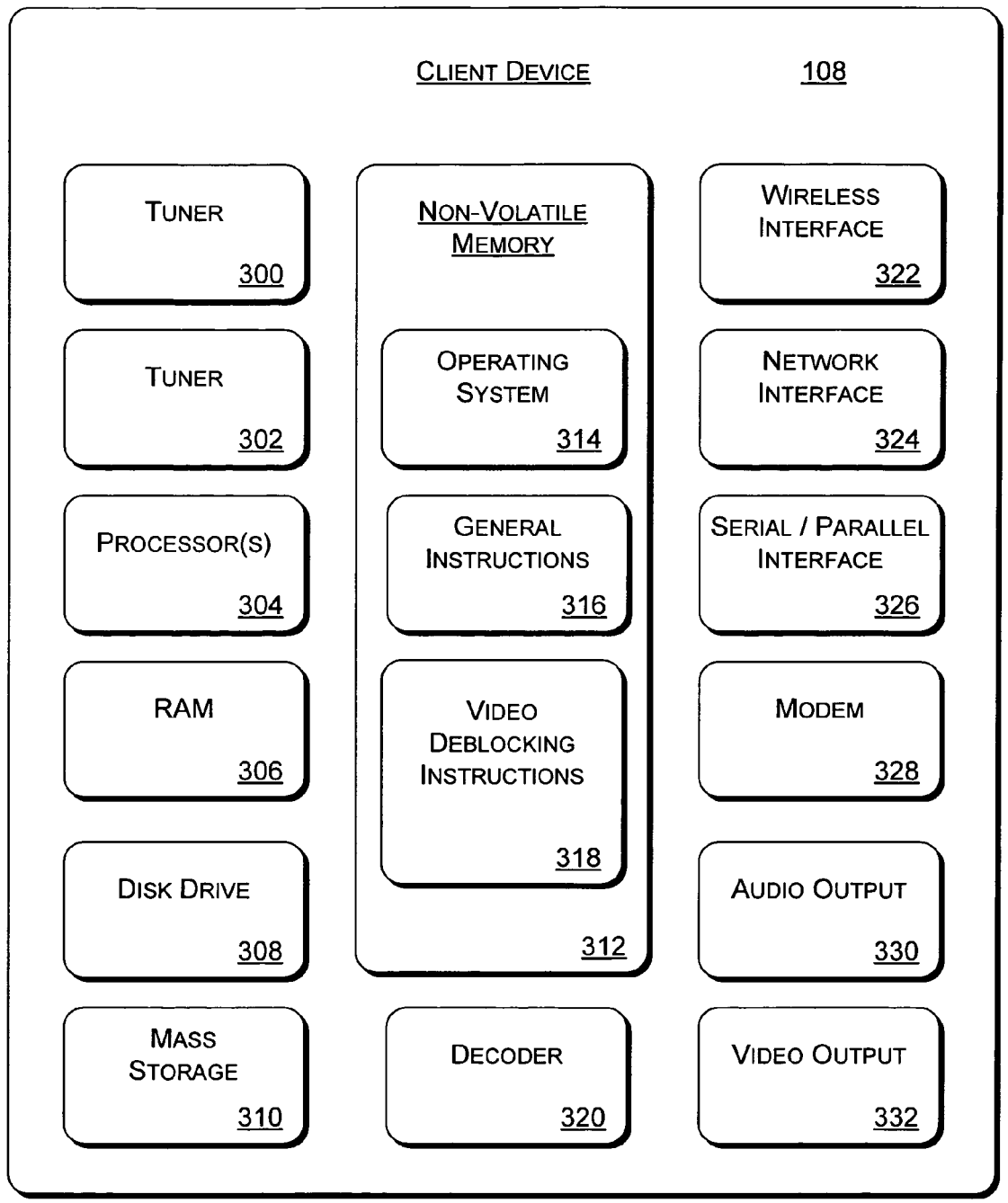
FIG. 3 is a block diagram that illustrates components of the exemplary client devices shown in FIGS. 1 and 2.

FIG. 3 illustrates selected components of exemplary client device 108 shown in FIGS. 1 and 2. Client device 108 includes a first tuner 300 and an optional second tuner 302. The tuners 300 and 302 are representative of one or more in-band tuners that tune to various frequencies or channels to receive television signals, as well as at least one out-of-bound (OOB) tuner that tunes to the broadcast channel(s) over which data information is broadcast (e.g., carouseled or otherwise transmitted) to client device 108.

Client device 108 also includes one or more processors 304 which process various instructions to control the operation of client device 108 and to communicate with other electronic and computing devices. Client device 108 can be implemented with one or more computer-readable media, examples of which include a random access memory (RAM) 306, a disk drive 308, another mass storage component 310, and a non-volatile memory 312 (e.g., ROM, Flash, EPROM, EEPROM, etc.). The computer-readable media (e.g., RAM 306, disk drive 308, mass storage 310, and non-volatile memory 312) store various instructions and/or information such as received content, programs, configuration information for client device 108, graphical user interface information, and/or video data or information.

Alternative implementations of client device 108 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource clients, however, may have limited processing and memory capabilities, such as a limited amount of RAM 306, no disk drive 308, and limited processing capabilities of a processor 304.

An operating system 314 and one or more programs as represented by general instructions 316 may be stored in non-volatile memory 312 (and/or other memory component(s)) and executed on processor 304 to provide a runtime environment. A runtime environment facilitates extensibility of client device 108 by allowing various interfaces to be defined that, in turn, allow the programs to interact with client device 108. Although these programs may be installed when client device 108 is manufactured, they may also be received via broadcast network 110 from content distribution system 106 (of FIG. 1). Also stored in non-volatile memory 312 (and/or other memory component(s)) are electronically-executable instructions for video deblocking 318, as described further herein.

Client device 108 also includes a decoder 320 to decode a broadcast video signal, such as an NTSC, PAL, SECAM or other TV system video signal. Processor 304, along with tuner(s) 300 and 302 and/or decoder 320, also enables client device 108 to reconstruct audio and video from an MPEG-2 stream or other digital packet signal, whether compressed or uncompressed. Client device 108 can also include other components pertaining to a television entertainment system which are not illustrated in this example. For instance, client device 108 can include a user interface application and user interface lights, buttons, controls, and the like to facilitate viewer interaction with the device.

Client device 108 further includes a wireless interface 322, a network interface 324, a serial and/or parallel interface 326, and a modem 328. Wireless interface 322 allows client device 108 to receive input commands and other information from a user-operated input device, such as from a remote control device or from another IR, Bluetooth, or similar RF input device. Network interface 324 and serial and/or parallel interface 326 allows client device 108 to interact and communicate with other electronic and computing devices via various communication links, including local network communication links to other client devices 108. Although not shown, client device 108 may also include other types of data communication interfaces to communicate with other devices. Modem 328 facilitates communication by client device 108 with other electronic and computing devices via a conventional telephone line.

Client device 108 also includes an audio output 330 and a video output 332 that provide signals to a television or other device that processes and/or displays or otherwise renders the audio and video information, including deblocked video information. Although shown separately, some of the components of client device 108 may be implemented together in an application specific integrated circuit (ASIC). For example, electronically-executable instructions (318) and associated processing abilities for video deblocking may be integrated together onto one or more ASICs instead of using more-general memory (e.g., 306, 312, etc.) and/or processing (e.g., 304, 320, etc.) resources of a client device (108).

Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Video Deblocking

Video information is often compressed or otherwise coded to facilitate the handling thereof. The coding of the video information into video data can reduce the bandwidth required to display, store, transmit, or otherwise manipulate the video information. For example, it can be beneficial to reduce the bit rate of video information for storing a video stream to disk or streaming it over a noisy, bandwidth-limited channel. However, compression and decompression of the video information typically causes visual artifacts that degrade the visual quality. One artifact that degrades visual quality is blockiness. In other words, low bit rate video information is often plagued with blockiness that seriously degrades visual quality. Video deblocking, on the other hand, usually entails reducing such blocky artifacts to enhance the visual presentation quality of the video information. Implementing a good deblocking mechanism helps to mitigate the deleterious byproducts of a lower bit rate video stream and thereby justifies using a lower bit rate that enables the aforementioned low-bandwidth applications.

Deblocking is implemented after previously encoded video data is decoded into at least a semblance of the original video information. One set of coding standards that may be used on the original video information are Moving Picture Expert Group (MPEG)-compliant standards. MPEG-based encoding/decoding algorithms involve performing a discrete cosine transform (DCT) on original video information and quantizing the DCT coefficients thereof. The resulting video data is de-quantized and an inverse DCT is performed to reacquire at least a semblance of the original video information. Reducing the bit rate of the video data stream may be achieved by more coarsely quantizing the DCT coefficients. In doing so, however, blockiness that is introduced along macroblock boundaries tends to seriously degrade the visual quality. The visual presentation quality may be at least partially restored by using deblocking during post-processing. Specifically, the deblocking may be used to reduce the blockiness around macroblock boundaries.

Figure 4:
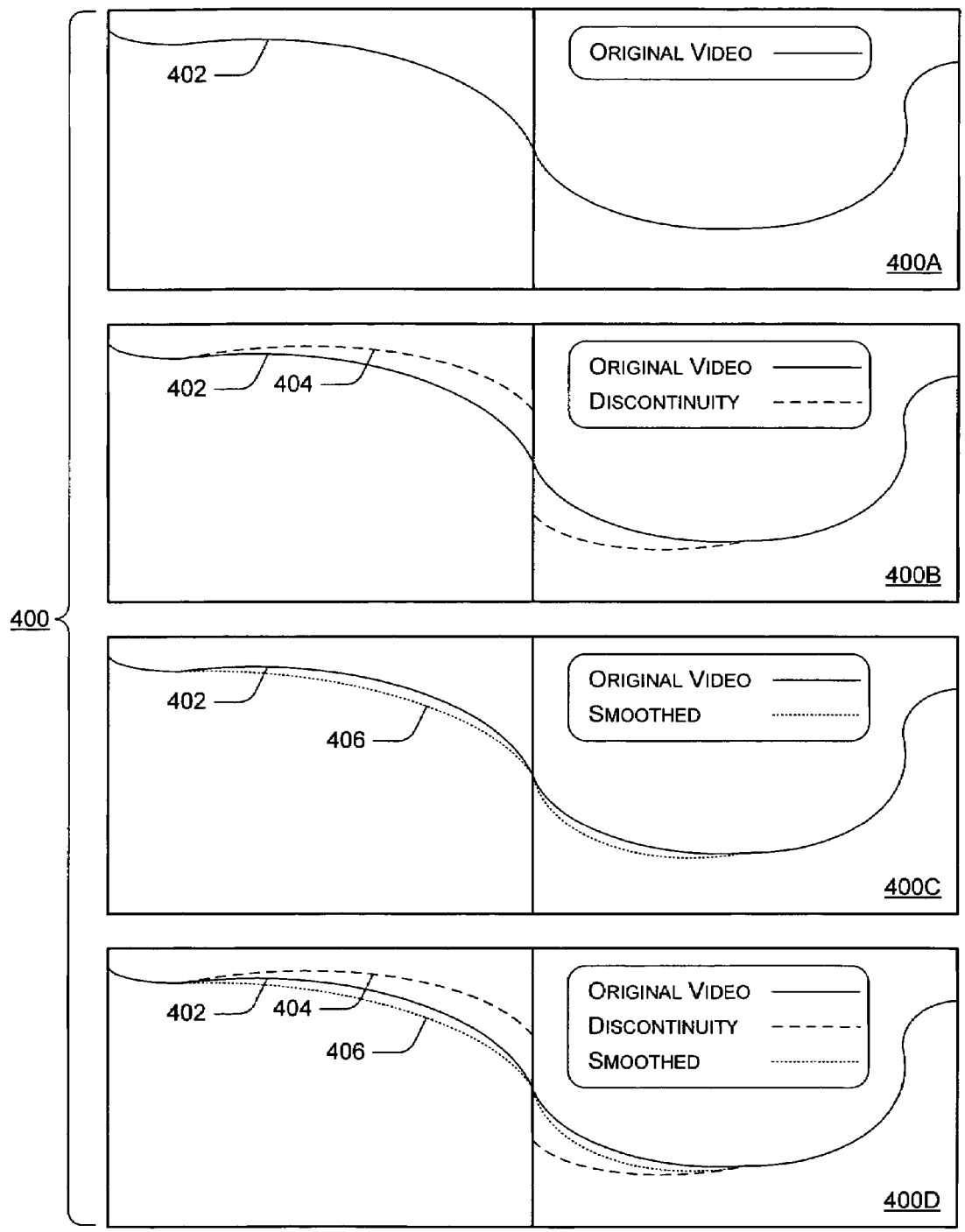
FIG. 4 is a set of graphs that illustrate an exemplary discontinuity and smoothing thereof.

FIG. 4 is a set of graphs 400 that illustrate an exemplary discontinuity and smoothing thereof. Graphs 400 include graphs 400A, 400B, 400C, and 400D. Each of graphs 400A-400D includes two macroblocks of a video picture. Although the macroblocks are shown as being rectangular, actual macroblocks may instead be square. Graph 400A illustrates original video information 402 (as a solid line). There is no break in original video information 402 between the left macroblock and the right macroblock.

Graph 400B illustrates original video information 402 and adds thereto an illustration of discontinuity 404 (as a large dashed line). Discontinuity 404 represents an exemplary discontinuity or break in the seamlessness of original video information 402. This discontinuity arises at the macroblock boundary of the left and right macroblocks as a result of the encoding/decoding process. Discontinuity 404 may be visible as a blocky artifact. In fact, discontinuity 404 along with other discontinuities in the overall picture may be visible as a blockiness that reduces the overall visual quality.

Graph 400C illustrates original video information 402 and adds thereto an illustration of smoothed video information 406 (as a small dashed line). Smoothed video information 406 results from application of video deblocking to discontinuity 404. While smoothed video information 406 is not likely to be an exact replica of original video information 402, smoothed video information 406 reduces the blocky artifact of discontinuity 404 and generally more-closely approximates original video information 402. It should be noted that smoothed video information 406 is representative of deblocking mechanisms/approaches in general, including visual adjustment, filter smoothing, spatial-temporal filtering, and so forth.

Graph 400D includes original video information 402, discontinuity 404, and smoothed video information 406. All three are included together to illustrate (i) the discontinuity that may be formed from coarse quantization of original video information or other deleterious coding/decoding factors and (ii) the resulting video information after the discontinuity has been smoothed in post-processing. This post-processing video deblocking is described further herein.

Specifically, the description herein focuses on deblocking in an MPEG-based environment in which discontinuities appear at macroblock boundaries. However, deblocking may be employed after decompression/decoding in accordance with other standards and approaches and along other boundaries. It should therefore be understood that deblocking may be employed with video data/information in general and regardless of the size/type of blocks that are employed to segregate the video picture.

Although the term "discontinuity" is used herein, other such terms include "edge" and "boundary". An edge, boundary, or discontinuity in a video picture may be "artificial" or "real". Artificial discontinuities arise, for example, from coarse quantization of DCT coefficients. Other terms for artificial discontinuities include, but are not limited to, quantization discontinuities, false discontinuities, fake discontinuities, and quantization noise discontinuities. Real discontinuities, on the other hand, arise from true boundaries in a video picture from one element to another element within the picture. Other terms for real discontinuities include, but are not limited to, actual discontinuities, true discontinuities, and natural discontinuities. These real discontinuities may also lie along a macroblock boundary. Consequently, if smoothing is performed on all discontinuities at all macroblock boundaries, some real discontinuities will be smoothed. This causes the picture to be fuzzy and less distinct. However, if discontinuities at macroblock boundaries can be separated into real discontinuities and artificial discontinuities, then smoothing may be performed on the artificial discontinuities.

Methods for Video Deblocking

Video deblocking may be described in the general context of electronically-executable instructions. Generally, electronically-executable instructions include routines, programs, objects, components, data structures, and the like that perform particular functions or implement particular abstract data types. Video deblocking may also be practiced in distributed computing environments where functions are performed by remote processing devices that are linked through a communications network. In a distributed computing environment, electronically-executable instructions may be located in both local and remote storage media.

Figure 5:
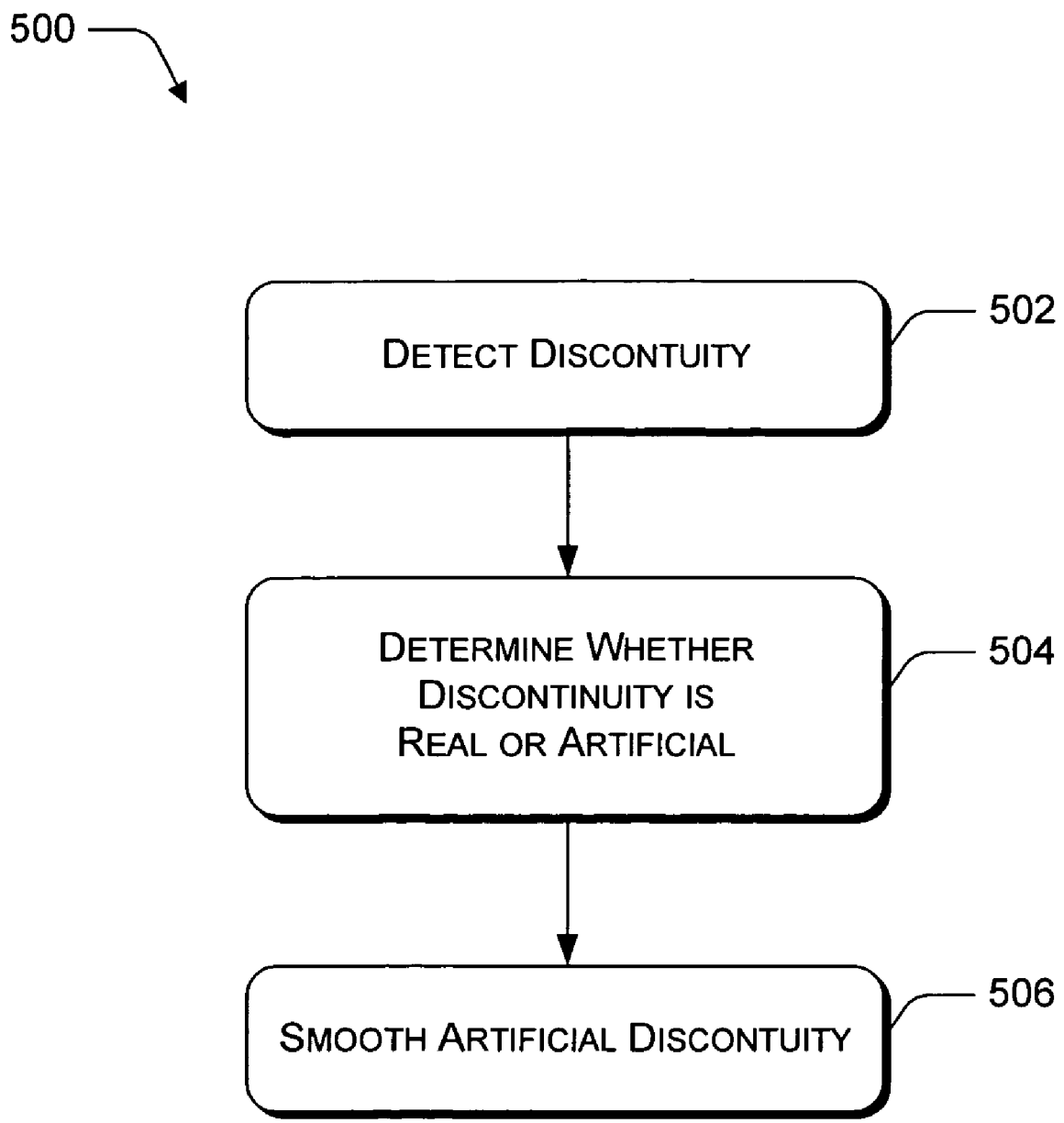
FIG. 5 is a flow diagram that illustrates an exemplary method for video deblocking.
Figure 6:
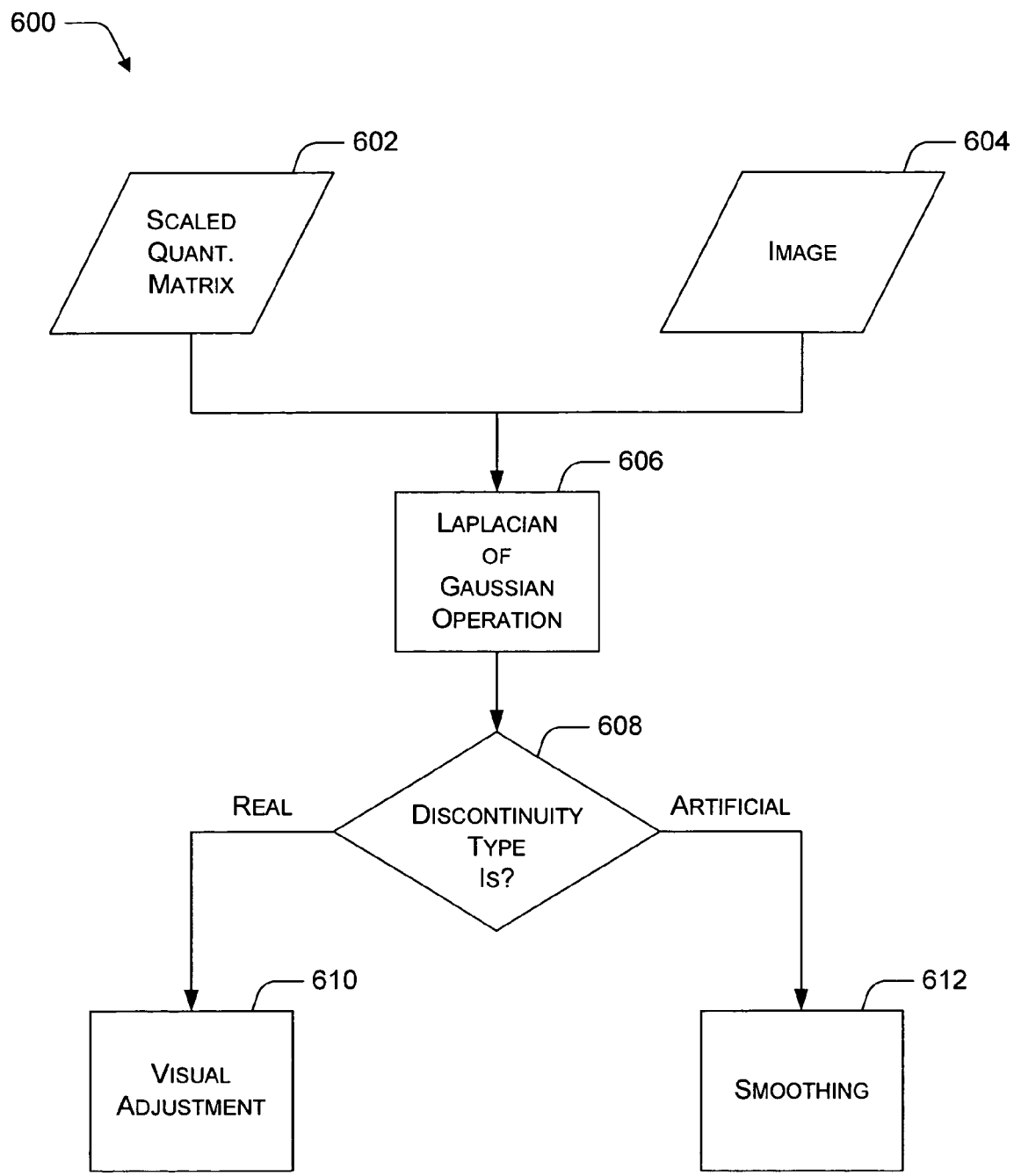
FIG. 6 is a flow diagram that illustrates an exemplary process for directly deblocking video.
Figure 14:
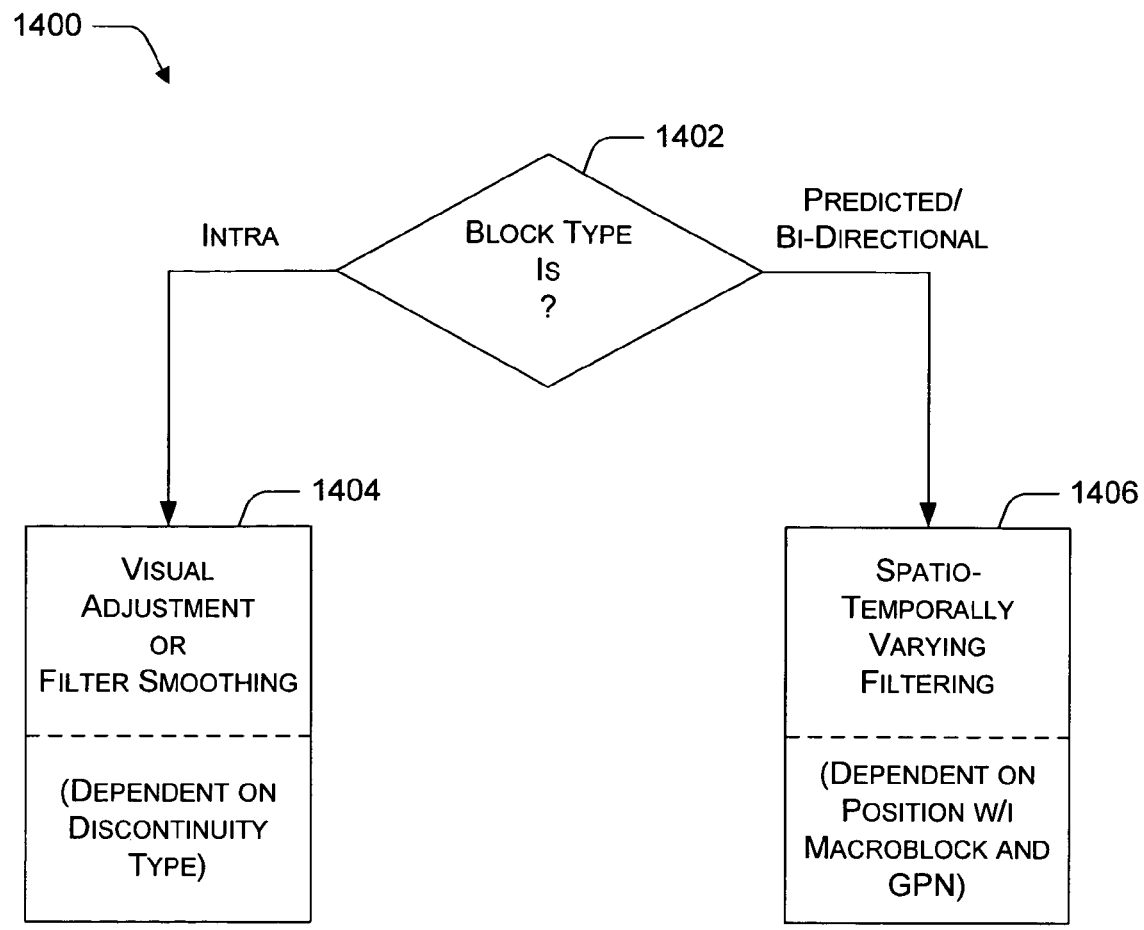
FIG. 14 is a flow diagram of an exemplary approach to block-type-dependent filtering under a Moving Pictures Expert Group (MPEG)-compliant compression/coding scheme.

The methods and processes of FIGS. 5, 6, and 14 are illustrated in flow diagrams divided into multiple blocks. However, the order in which the methods and processes are described is not intended to be construed as a limitation, and any number of the described blocks can be combined in any order to implement one or more methods or processes for video deblocking. Furthermore, although the methods and processes are described below with reference to the television entertainment environments 100 and 200 and client devices 108 where applicable, the methods and processes can be implemented in any suitable hardware, software, firmware, or combination thereof and using any suitable mathematical alternatives.

FIG. 5 is a flow diagram 500 that illustrates an exemplary method for video deblocking. Flow diagram 500 includes blocks 502, 504, and 506 that may be implemented, for instance, by client devices 108 (of FIGS. 1-3). Blocks 502, 504, and 506 may correspond to electronically-executable instructions that are stored in one or more memories of a client device 108 and executed using one or more processors thereof. At block 502, a discontinuity is detected. For example, macroblock boundaries are analyzed to detect whether a discontinuity exists for video information between a first macroblock boundary and a second macroblock boundary. An exemplary window around a macroblock boundary for such an analysis is described further below with reference to FIG. 7.

At block 504, the discontinuity is examined to determine whether it is a real discontinuity or an artificial discontinuity. Real edges of actual picture elements may fall on a macroblock boundary, but smoothing real edges usually decreases video presentation quality. Exemplary mechanisms for differentiating between real discontinuities and artificial discontinuities are described further below especially with reference to FIGS. 8 and 9.

At block 506, the artificial discontinuity or discontinuities are smoothed. The smoothing of the artificial discontinuities reduces visually-apparent blockiness. It should be understood that smoothing may encompass a variety of mechanisms/approaches designed to reduce or eliminate the visibility of discontinuities. Exemplary mechanisms for smoothing artificial discontinuities are described further below especially with reference to FIG. 10 et seq.

Flow diagram 500 is directed to both direct deblocking and indirect deblocking. Direct deblocking of video is described especially with reference to FIGS. 6-10. Indirect deblocking of video is described especially with reference to FIGS. 11A-13B. The description of FIG. 14 below is directed to a video deblocking approach that utilizes both direct and indirect deblocking mechanisms.

FIG. 6 is a flow diagram 600 that illustrates an exemplary process for directly deblocking video. Flow diagram 600 includes six (6) blocks 602-612. Blocks 602 and 604 pertain to input data for the process of flow diagram 600. Block 602 provides the scaled quantization matrix that was used to quantize the original video information during the coding/compressing process. This scaled quantization matrix of block 602 may be related to, for example, the "quant_matrix" parameter of MPEG-compliant coding schemes. The quant_matrix is determined by the encoder and encoded into the bit stream. A scaled quant matrix may be created as the product of the quant matrix and the quantization scale, which is another parameter that is encoded into the bit stream by the encoder. Block 604 provides the image that is formed from the decoded video information. As such, the image may include artificial discontinuities (e.g., at macroblock boundaries) and real discontinuities (e.g., either at or away from macroblock boundaries). The artificial discontinuities at the macroblock boundaries can arise from noise attributable to the quantization matrix during the quantization process.

The scaled quantization matrix of block 602 and the image video information of block 604 are submitted to block 606. Block 606 performs a Laplacian of Gaussian (LoG) operation on each of the scaled quantization matrix of block 602 and the image video information of block 604 to produce two different results. The LoG operation may be defined as convolving the argument with the LoG kernel. From the two different results of applying the LoG operation, the type of discontinuity is determined at block 608. For example, the type of discontinuity (if any) at the macroblock boundary under consideration is determined by comparing the result of the LoG operation as performed on the image of block 604 with a (quantization) threshold determined responsive to the result of the LoG operation as performed on the scaled quantization matrix of block 602. The LoG operation of block 606 and the discontinuity type determination of block 608 are described further below especially with reference to FIGS. 8 and 9.

If the discontinuity at the macroblock boundary is determined to be a real discontinuity (at block 608), block 610 may optionally perform a visual adjustment procedure at the macroblock boundary. An exemplary visual adjustment procedure is described further below especially with reference to FIG. 10. If, on the other hand, the discontinuity at the macroblock boundary is determined to be an artificial discontinuity (at block 608), block 612 performs a filter smoothing procedure at the macroblock boundary. An exemplary filter smoothing procedure is described further below primarily after the description of FIG. 10.

Figure 7:
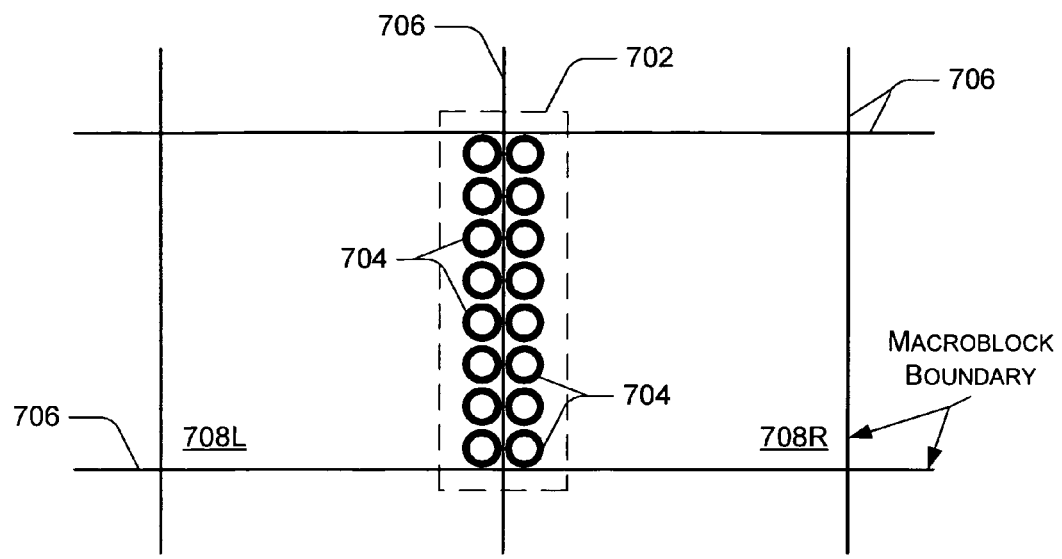
FIG. 7 illustrates an exemplary window for deblocking analysis around a macroblock boundary.

FIG. 7 illustrates an exemplary window 702 for deblocking analysis around a macroblock boundary 706. Two macroblocks 708L and 708R are illustrated. Each macroblock 708 is surrounded by four (4) macroblock boundaries 706. Within each macroblock 708 are a set of pixels. Although macroblocks 708 are shown as being blocks of eight-by-eight (8×8) pixels, they may alternatively be blocks of 16×16 pixels, 24×24 pixels, 30×30 pixels, or any other size. Because the illustrated macroblocks are of an eight-by-eight (8×8) size, window 702 includes sixteen (16) pixels to be analyzed for possible discontinuities at the macroblock boundary 706 that window 702 surrounds. However, the width of window 702 may alternatively be greater than two pixels (i.e., the width can be more than one pixel within each macroblock 708).

Window 702 is located between the left macroblock 708L and the right macroblock 708R. Similar "vertical" windows 702 are used at the other "vertical" macroblock boundaries 706. Furthermore, "horizontal" windows (not shown) are used at macroblock boundaries between upper macroblocks and adjacent lower macroblocks. In other words, to address a two-dimensional (2-D) image, video deblocking is performed in both the vertical direction and the horizontal direction.

To detect a discontinuity within a window 702, the following algorithm may be employed: Let Q represent the quantization matrix used in quantizing an image I. Because quantization is usually performed in the DCT domain, the effect of using Q in the time domain is first determined. Thus, an inverse DCT is performed on Q to generate $Q_t$. Next, the discontinuities (e.g., edges, boundaries, etc.) are detected in the image I. Any such discontinuities may be detected using the Laplacian of Gaussian (LoG) operator to filter I and generate $I_{LG}$. The LoG operator may be considered a concatenation of the Laplacian operator, which is given by:

$$L(x, y) = \nabla^2 f(x, y) = \frac{\partial^2 f(x, y)}{\partial x^2} + \frac{\partial^2 f(x, y)}{\partial y^2}$$

and the Gaussian operator, which is given by:

$$G(x, y) = \frac{1}{2\pi} e^{-\frac{1}{2\sigma^2}(x^2+y^2)}$$

thereby yielding:

$$LoG(x, y) = -\frac{1}{\pi\sigma^4}\left[1 - \frac{x^2+y^2}{2\sigma^2}\right] e^{-\frac{x^2+y^2}{2\sigma^2}}.$$

The filtered image is therefore given by:

$I_{LG} = LoG * I.$

Figure 8:
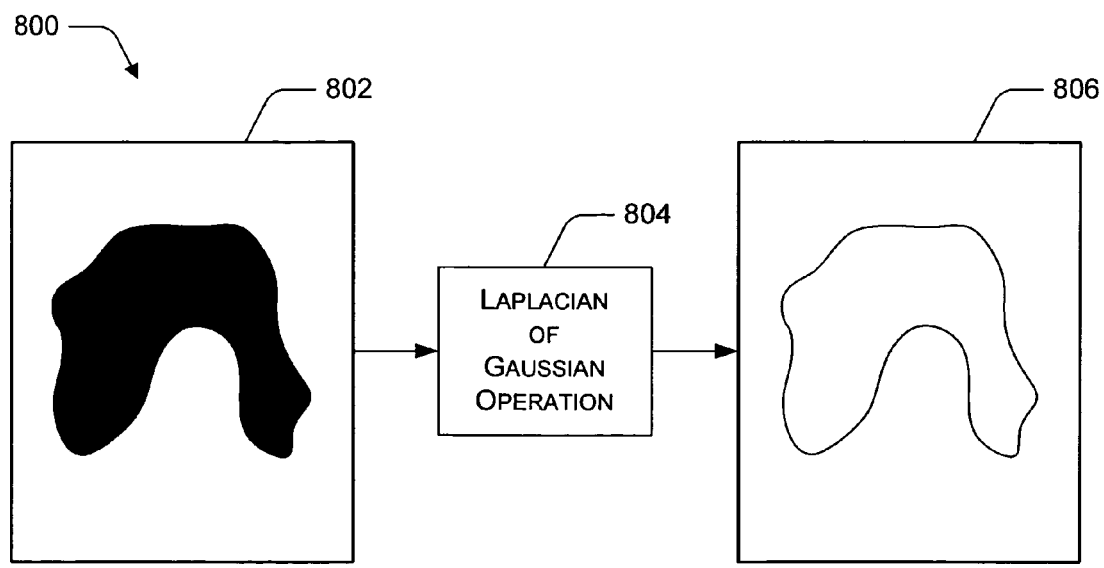
FIG. 8 illustrates an exemplary Laplacian of Gaussian (LoG) operation in diagrammatic form.

FIG. 8 illustrates an exemplary Laplacian of Gaussian (LoG) operation 800 in diagrammatic form. An image 802 is filtered using LoG operation 804 to produce an edge-biased image 806. After applying the LoG operation to image I, discontinuities (e.g., edges) can be detected in each window 702 surrounding every analyzed macroblock boundary 706. However, it is still to be determined whether each discontinuity in each window 702 is a real discontinuity (e.g., from an edge of an image element) or an artificial discontinuity (e.g., from quantization or other deleterious compression/decompression factors). The LoG operation detects both kinds of discontinuities, but it does not clearly differentiate between them by itself A variable that may be termed "quant_threshold" is created to determine which discontinuities are artificial. The amount of blockiness attributable to quantization noise is effectively assessed. In order to assess the amount of blockiness attributable to quantization, the time-domain quantization matrix divided by two ($Q_t/2$) is passed through the LoG filter to obtain $Q_{tLG}$. The quantization matrix $Q_t$ is divided by 2 because half the quantization matrix $Q_t$ represents the actual loss of data due to round-off/truncation. After obtaining $Q_{tLG}$ from passing ($Q_t/2$) through the LoG filter, the maximum and minimum values of $Q_{tLG}$ are examined to determine the quant_threshold.

Figure 9:
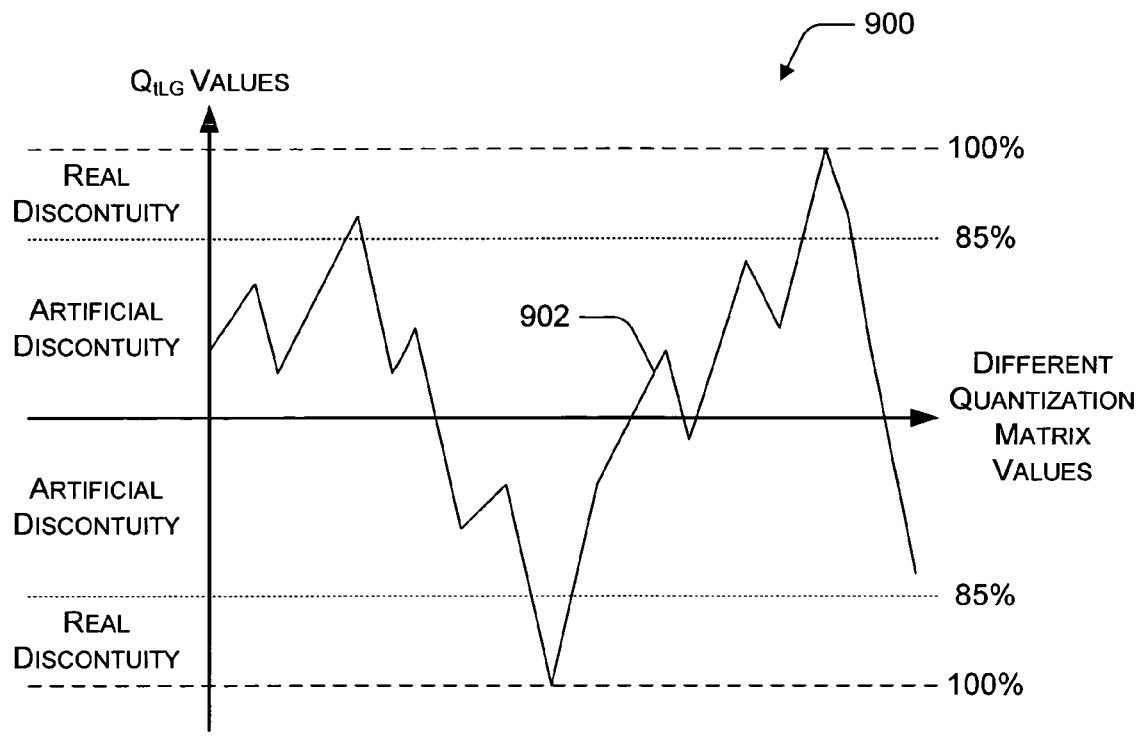
FIG. 9 is a graph that illustrates exemplary values resulting from an LoG operation on a quantization matrix.

FIG. 9 is a graph 900 that illustrates exemplary values $Q_{tLG}$ resulting from a LoG operation on a time-domain quantization matrix $Q_t$. Thus, a plot 902 graphs different quantization matrix values (along the abscissa axis) versus corresponding LoG operation output values $Q_{tLG}$ (along the ordinate axis). Maximum absolute values for the $Q_{tLG}$ values are denoted as one hundred percent (100%). Any portion of the 100% value may be selected as the threshold between real discontinuities and artificial discontinuities. The threshold may be selected, for example, such that the majority of the visually displeasing artificial discontinuities are subject to smoothing while few if any of the real discontinuities are subject to smoothing (therein mitigating "fuzzying" of the original image). An optimum value for the threshold for any given type of video information may be selected through experimental viewing of deblocked video. In the illustrated graph 900, eighty-five percent (85%) is selected as the threshold between real discontinuities and artificial discontinuities. Furthermore, this threshold may be tunable subject to user/viewer preferences.

After the threshold between real discontinuities and artificial discontinuities is selected, the threshold is used in conjunction with an analysis of macroblock boundaries 706 in windows 702. The analysis is focused in windows 702 because blockiness that is due to quantization noise is centered on macroblock boundaries 706. The values of $I_{LG}$ are compared to the threshold within each window 702. If more than a certain fraction, η, of the $I_{LG}$ values in a window 702 are above the selected threshold, then that discontinuity is labeled as a real discontinuity. If not, then that discontinuity is labeled as an artificial discontinuity. The fraction, η, may also be selected experimentally, for example by viewing different types of video that has been deblocked using different values for the fraction, η, until a visually-appealing value is selected. The parameter, η, may be experimentally determined and fine tuned to maximize visual quality.

After discontinuities have been (i) detected and (ii) determined to be (and "labeled" as) either real discontinuities or artificial discontinuities, appropriate deblocking procedures can be implemented. As described above with reference to blocks 608, 610, and 612 (of FIG. 6), real discontinuities may be subjected to a visual adjustment procedure, and artificial discontinuities may be subjected to a filter smoothing procedure. In an exemplary visual adjustment procedure, pixel values are adjusted slightly by moving them towards each other by an amount proportional to the threshold so as to reduce the effects of quantization.

Figure 10:
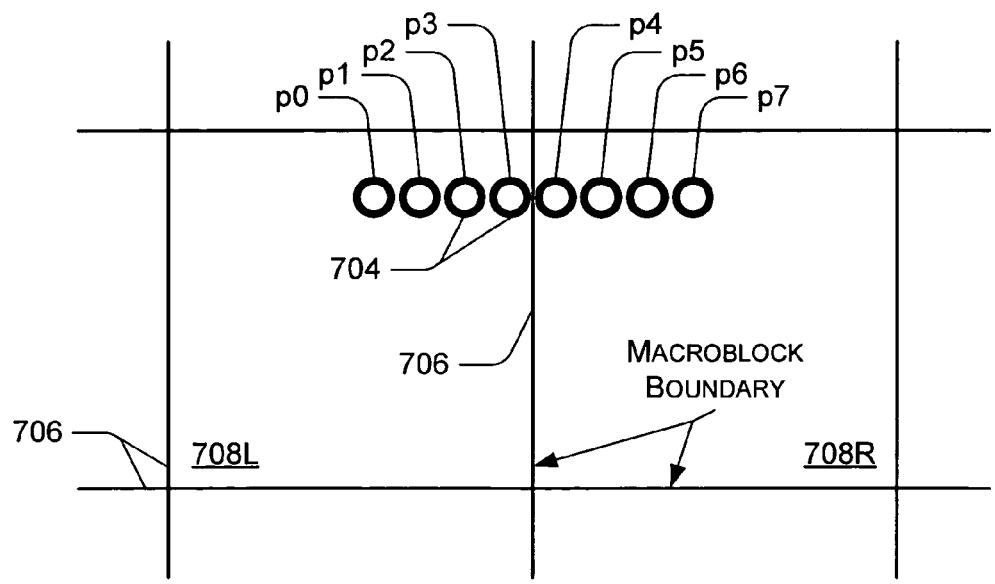
FIG. 10 illustrates pixels around a macroblock boundary for an exemplary visual adjustment procedure.

FIG. 10 illustrates pixels 704 around a macroblock boundary 706 for an exemplary visual adjustment procedure. Eight (8) adjacent pixels 704 from p0 to p7 are divided by the macroblock boundary 706 that is between left macroblock 708L and right macroblock 708R. Pixels p0, p1, p2, and p3 are in left macroblock 708L. Pixels p4, p5, p6, and p7 are in right macroblock 708R. The values of the pixels p0 to p7 are adjusted slightly by moving them towards each other by an amount proportional to the selected threshold so as to reduce the effects of quantization. This adjustment is performed recursively to the adjacent pixels.

The exemplary visual adjustment procedure for real discontinuities, when performed, may be effectuated as follows: Let $p=[p_0 p_1 \ldots p_7]$ represent the pixels 704 around a macroblock boundary 706 as illustrated in FIG. 10. The following series of operations are performed:

$$d = \min\left(\frac{p_3 - p_4}{2}, \text{quant\_threshold}\right)$$

$$p'_3 = p_3 - d$$

$$p'_4 = p_4 + d$$

$$p'_2 = \frac{p_2 + p'_3}{2}$$

$$p'_5 = \frac{p_5 + p'_4}{2} \ldots$$

where decoded, time-domain pixels are designated by "p" (p without the prime) and the adjusted pixels are represented by "p'" (p with the prime).

If, on the other hand, a detected discontinuity has been determined to be, and "labeled" as, an artificial discontinuity, then a filter smoothing procedure is performed. In an exemplary filter smoothing procedure, pixels 704 (of FIG. 7) of a window 702 are filtered around boundary 706 with a smoothing filter. In other words, a pixel array, p, is filtered with a smoothing filter such as stretched and/or scaled version(s) of the Gaussian or tent filter. An example of a Gaussian/tent filter is:

$$G[n] = \frac{1}{2\pi} e^{-\frac{1}{2\sigma^2} n^2}$$

$$T[n] = \begin{cases} 1 - \left|\frac{n}{5}\right| & -5 \leq n \leq 5 \\ 0 & \text{otherwise} \end{cases}$$

In general, any smoothing filter can be used with the degree of smoothing set to accommodate the desired amount of blurring.

In the second approach to video deblocking, a less rigid and more indirect mechanism is used to detect discontinuities, to differentiate between real and artificial discontinuities, and to smooth the detected discontinuities. This second mechanism includes both spatial and temporal aspects. In a spatial aspect, the mechanism entails associating an increased likelihood of needing deblocking (e.g., of a discontinuity being an artificial discontinuity) with increased proximity to a macroblock boundary. In a temporal aspect, the mechanism entails associating the likelihood of blockiness at a macroblock boundary to the position of the picture within a GOP. For example, it is assumed that an I-frame of the GOP is more susceptible to blockiness at the macroblock boundary. On the other hand, a B-frame downstream in the GOP is less likely to experience blockiness at the macroblock boundary.

Figure 11A:
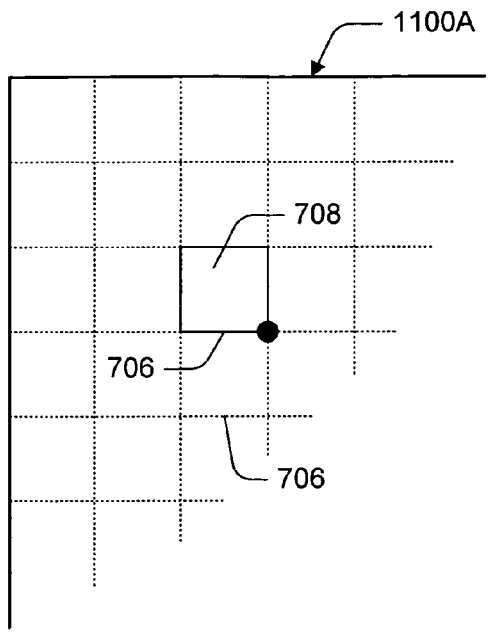
FIGS. 11A, 11B, and 11C are exemplary diagrams of a portion of a video information presentation across multiple frames of a group of pictures (GOP).
Figure 11B:
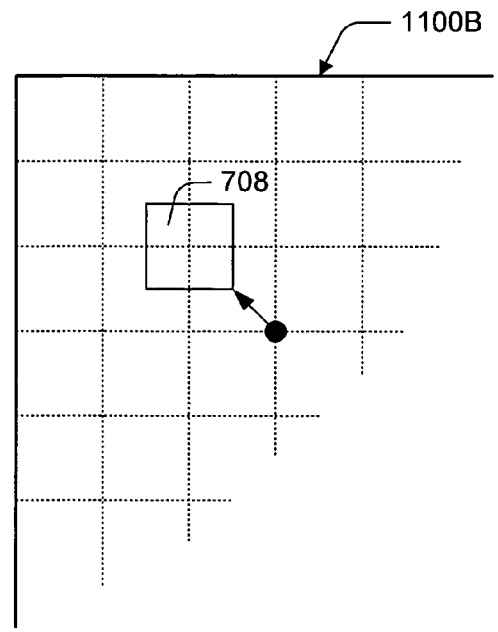
Figure 11C:
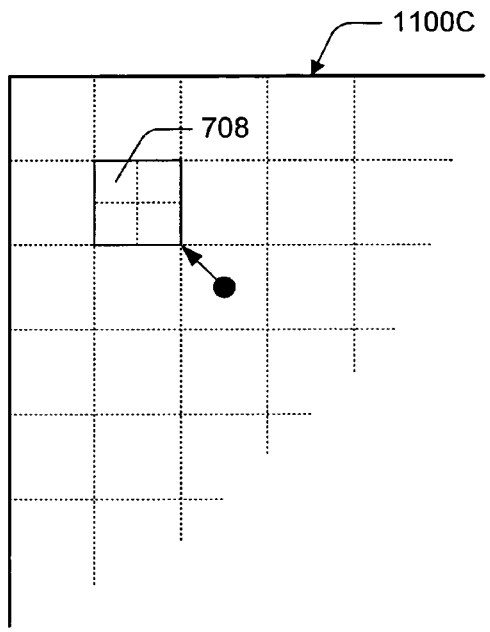

FIGS. 11A, 11B, and 11C are exemplary diagrams 1100 of a portion of video information that is presented across multiple frames of a GOP. In an MPEG-compliant coding scheme, frames are organized into GOPs that start with an intra (I) frame and are followed by predicted (P) frames and bi-directional (B) frames/modes. I-frames are usually more susceptible to blockiness at macroblock boundaries than those frames that are downstream in the GOP as is explained by the description of the diagrams 1100A-C. Specifically, diagram 1100A represents an intra-frame with many macroblocks 708 and macroblock boundaries 706.

Diagrams 1100B and 1100C represent non-intra frames. Each non-intra block in non-intra frames includes two components: the predicted term and the difference term. Typically, the predicted term dominates, and the difference term is relatively small. Because the predicted term is usually not macroblock aligned in the reference frame (as shown in diagram 110B), any macroblocking effects in the reference frame are seen in the interior of the reconstructed macroblock in the current frame. Moreover, as this effect occurs over several generations of prediction, the magnitude and location of blockiness tends to be diffused (as shown in diagram 1100C). In other words, downstream in a GOP, images tend to be both less crisp as well as less blocky. Thus, the position of a frame in a GOP, or GOP position number (GPN), tends to serve as an indicator of the extent of blockiness. This tendency is reflected in the temporal aspect of the second mechanism. Similarly, for the spatial aspect of the second mechanism, the extent of quantization-caused blockiness tends to increase as pixel location approaches a macroblock boundary.

The second mechanism thus involves filtering the image with a spatio-temporally varying filter. The degree of filtering increases for pixels near macroblock boundaries and decreases for pixels away from macroblock boundaries. This spatial filtering is described further below with reference to FIG. 12. Also, the degree of filtering is higher at the beginning of a GOP while the degree of filtering decreases downstream in the GOP. This temporal filtering is described further below with reference to FIGS. 13A and 13B. Combining the spatial filtering with the temporal filtering creates a spatio-temporally varying filter that indirectly detects discontinuities, differentiates between discontinuity types, and smooths the detected discontinuities.

Figure 12:
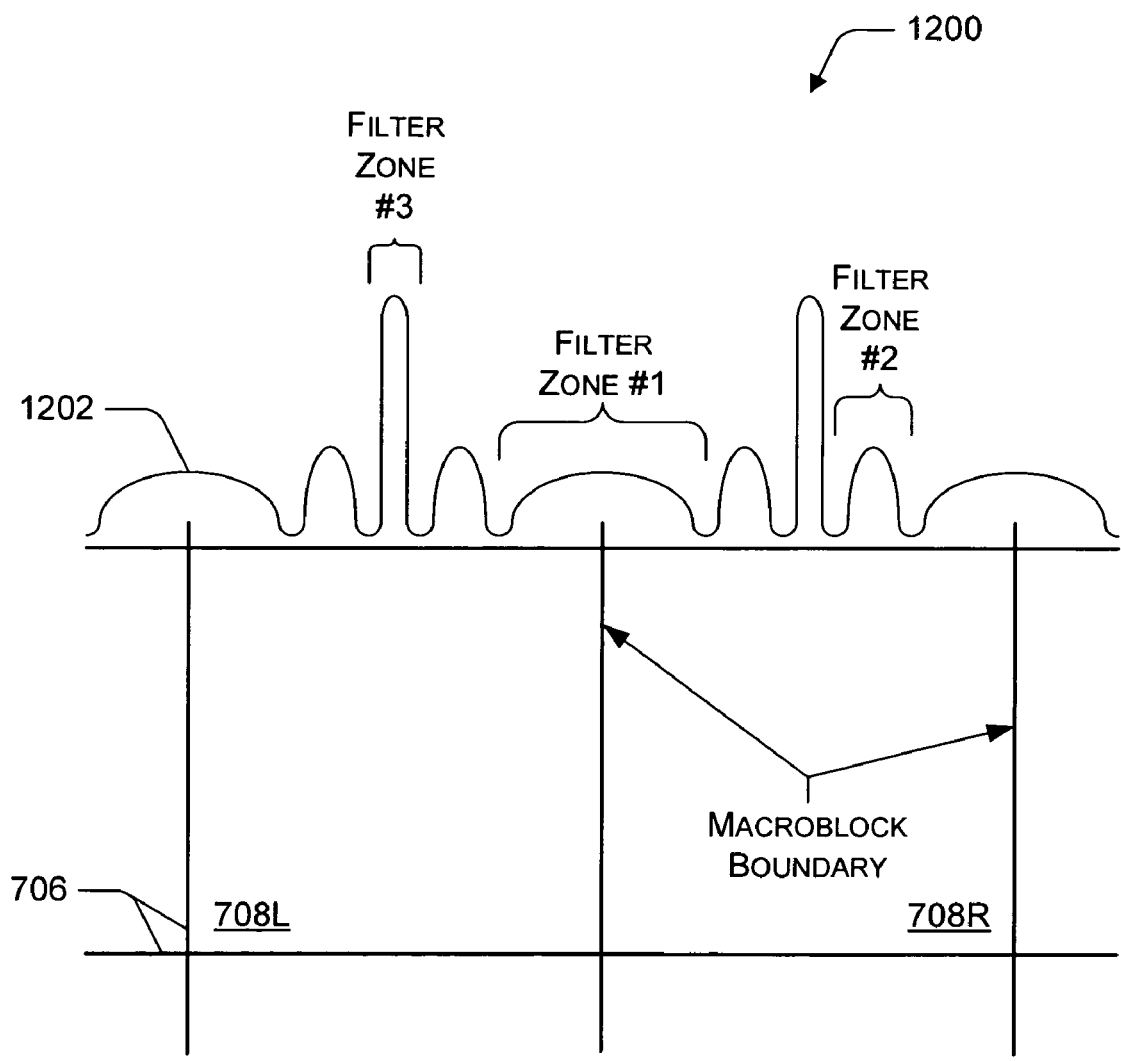
FIG. 12 is a graph that illustrates filters across macroblocks and macroblock boundaries in an exemplary approach for indirectly deblocking video using spatial filtering.

FIG. 12 is a graph 1200 that illustrates filters 1202 across macroblocks 708 and macroblock boundaries 706 in an exemplary approach for indirectly deblocking video using spatial filtering. Filters 1202 include three (3) different filtering zones labeled zone #1, zone #2, and zone #3. While each of the three different filtering zones may have filters of similar or identical energy levels (to avoid changing image intensity), each of the filters of the three different filtering zones filters pixels of the macroblocks 708 differently. Filtering zone #1 filters to the greatest degree in an area around macroblock boundaries 706. Filtering zone #3 filters the least in an area around the center of macroblocks 708. Filters of filtering zones #3 may be implemented as an impulse function so that the pixels are changed very slightly or not at all. The centers of macroblocks 708 are the least likely to exhibit blockiness due to quantization noise. Located spatially between the filtering zones #1 and #3 are filtering zones #2. The filters of filtering zones #2 filter the corresponding physically-intermediate pixels to a degree that is also intermediate to that of the filters of filtering zones #1 and #3.

Using multiple filtering zones, the pixels may be averaged, for example, to a greater extent near macroblock boundaries and to gradually lesser extents for pixels that are gradually nearer the middle of macroblocks. Although filter 1202 includes an exemplary three filtering zones, four or more or less than three filtering zones may alternatively be employed. An example of a suitable spatial filter is:

$$G_\sigma[n] = \frac{1}{2\pi} e^{-\frac{1}{2\sigma^2} n^2}$$

where we can distinguish the various zones on the basis of the chosen value for σ, for instance, as:
Zone 1: σ=1;
Zone 2: σ=0.707; and
Zone 3: σ=0.5.

Furthermore, the filters can be normalized in order to achieve a gain of 1 (or any desired value). Such spatial filtering thus concentrates filtering near macroblock boundaries and away from the center of macroblocks. Using a spatial filter designed accordingly effectively tends to indirectly filter blockiness due to quantization noise.

FIGS. 13A and 13B illustrate an exemplary approach for indirectly deblocking video using temporal filtering across multiple frames of a GOP. The extent of spatial filtering that is necessary and/or desirable around macroblock boundaries tends to decrease as frame position number proceeds through a GOP, as is explained above with reference to FIGS. 11A-11C. Chart 1300A illustrates a GOP and exemplary temporal filtering coefficients designated as α. The GOP position number (GPN) runs from 1 to n, where n may be any natural number, but is often set to fifteen (15). The MPEG frames are designated by I, B, or P in an exemplary sequence that runs: I, B, B, B, P, B, B, B, P, B, B, B, P, B, B. Other sequences may alternatively be used. Three different sets of temporal filtering coefficients α are included and are designated as α1, α2, and α3.

The temporal filtering coefficient α may be applied to the spatial filtering as described above with reference to FIG. 12. The temporal filtering coefficient α serves to reduce the filtering by, and therefore the impact of, the spatial filter 1202 as frames progress downward through the GOP. Consequently, each α may be determined responsive to the GPN of the frame under consideration. Table 1300B provides a general GPN-dependent formula for determining an α for each of the three temporal filtering coefficient α examples. Each of the α examples decrease in value as the GPN increases to reduce the impact of the spatial filter. The rapidity at which each α decreases in value as the GPN increases from 1 to n scales from a low with α1 to a high with α3. Besides the formulas provided in table 1300B, other formulas for determining α may alternatively be employed. Such other formulas, or even other sets of α values that are not necessarily formulaic, need not use an actual GPN numeral to set the α.

The temporally varying parameter, α, may be used to vary the degree of filtering using, for example, the following approach:

$$G_\sigma[\alpha, n] = K \cdot \frac{1}{2\pi} e^{-\frac{1}{2(\alpha\sigma)^2}n^2}$$

where the number K is chosen to normalize the energy in the filter. Also, if the filtering ability of the spatial filter 1202 is inversely proportional to α, then the α formula may be set up so as to increase with increasing GPN.

An application of the α formulas of table 1300B are provided under the appropriate GPNs of chart 1300A. For example, given an n=15, α1 is the set of numbers {1, 14/15, 13/15, 12/15, 11/15, ..., 2/15, 1/15}; α2 is the set of numbers {1, 1/2, 1/3, 1/4, 1/5, ..., 1/14, 1/15}; and α3 is the set of numbers {1, 1/4, 1/9, 1/16, 1/25, ..., 1/196, 1/225}. An α formula or set of values that results in visually-pleasing video may be determined experimentally for any given type of video information. Use of the temporal filtering coefficient α as a modifier to a spatial filter 1202 enables application of a spatio-temporally varying filter that indirectly detects, differentiates between types of, and smoothes discontinuities.

FIG. 14 is a flow diagram 1400 of an exemplary approach to block-type-dependent filtering under an MPEG-compliant compression/coding scheme. The second mechanism, as described above with particular reference to FIGS. 11A-13B, may be applied to all frames of a GOP. Alternatively, the approach of flow diagram 1400 may be employed in which the video deblocking mechanism that is being applied depends on the frame/block type. Flow diagram 1400 is described in terms of blocks such as macroblocks, but it may instead be implemented on a frame-only basis. More generally, blocks, frames, macroblocks, etc. may be considered units of an image.

As noted above especially in the descriptions of FIGS. 11A-11C and 13A, each MPEG GOP starts with an I-frame. This I-frame has relatively hard and certain macroblock boundaries. Non-I-frames (e.g., B-frames and P-frames), on the other hand, may have discontinuities that are not macroblock aligned in the current frame. To handle this difference, the first mechanism (which is more direct) may be applied to I-frames while the second mechanism (which is more indirect) may be applied to non-I-frames. Thus, the deblocking under such a scheme is frame-type-dependent. Under MPEG coding, however, individual macroblocks in a non-I-frame may be equivalent to an I-frame. In other words, some blocks in P-frames and B-frames are unpredicted, have no inherent discontinuity blurring, and are macroblock aligned in the current frame. These I-blocks in P-frames and B-frames can thus be treated using the more direct first mechanism.

Accordingly, a determination as to which mechanism is to be used under an MPEG-compliant coding scheme may be block-type-dependent. In flow diagram 1400, a flow diagram block 1402 determines whether a block under consideration is (i) an intra block or (ii) a predicted or a bi-directional block. For example, prior to actual smoothing, each macroblock of a frame of video information may be analyzed to determine whether it is an I-block or a P-block/B-block. If it is determined to be an I-block, then a visual adjustment procedure or a filter smoothing procedure is implemented at flow diagram block 1404. Whether a visual adjustment procedure or a filter smoothing procedure is implemented is dependent on discontinuity type. As described further above with reference especially to FIGS. 6-10, the visual adjustment procedure is applied to real discontinuities and the filter smoothing procedure is applied to artificial discontinuities.

If, on the other hand, the block under consideration is determined to be a P-block or a B-block (e.g., a non-I-block), then a spatio-temporally varying filtering procedure is implemented for the block under consideration at flow diagram block 1406. The extent of filtering for any given pixel or set of pixels is dependent on the spatial position of the pixel or pixels within the block. The extent of filtering for the given pixel or set of pixels is also dependent on the temporal-based GPN of the frame of which the block forms a part. Such a spatio-temporally varying filtering procedure is described further above with reference especially to FIGS. 11A-13B. In manners in accordance with flow diagram 1400, the different types of MPEG frames or blocks may therefore be handled using different deblocking mechanisms.

CONCLUSION

Although systems and methods have been described in language specific to structural features and/or methods, it is to be understood that the invention defined in the appended claims is not necessarily limited to the specific features or methods described. Rather, the specific features and methods are disclosed as exemplary forms of implementing the claimed invention.

The invention claimed is:
1. A method for providing video deblocking, implemented on a computing device by a processor configured to execute instructions that, when executed by the processor, direct the computing device to perform acts comprising:
applying, by the processor, a Laplacian of Gaussian (LoG) operation on an image to produce a first plurality of values, the image being previously encoded using a quantization matrix;
applying the LoG operation on the quantization matrix to produce a second plurality of values;
determining a threshold responsive to the second plurality of values;
comparing at least a portion of the first plurality of values to the threshold;
ascertaining a number of the at least a portion of the first plurality of values that exceed the threshold; and
if the number is less than a predetermined fraction, then labeling a discontinuity that is associated with the at least a portion of the first plurality of values as an artificial discontinuity.

2. The method as recited in claim 1, further comprising:
if the number is greater than the predetermined fraction, then labeling the discontinuity that is associated with the at least a portion of the first plurality of values as a real discontinuity.

3. The method as recited in claim 2, further comprising:
performing a visual adjustment procedure on the real discontinuity.

4. The method as recited in claim 1, wherein the at least a portion of the first plurality of values corresponds to pixels of the image that are proximate to at least one macroblock boundary.

5. The method as recited in claim 1, wherein the quantization matrix comprises a scaled quantization matrix.

6. The method as recited in claim 1, wherein the action of determining a threshold responsive to the second plurality of values comprises:
selecting a percentage of an absolute maximum value of the second plurality of values as the threshold.

7. The method as recited in claim 1, further comprising:
performing a filter smoothing procedure on the artificial discontinuity.

8. Computer-readable media comprising instructions that, when executed, direct a processor of an electronic device to perform the method as recited in claim 1.

9. The method as recited in claim 1, wherein the applying the LoG operation further comprises dividing the quantization matrix by two and applying the LoG operation to produce the second plurality of values and the determining a threshold is based on at least one of:
experimental viewing of deblocked video;
user preferences; or
around 80 to 90 percent of a maximum absolute value of the second plurality of values.

10. An arrangement capable of deblocking video, comprising:
detecting means for detecting one or more discontinuities at macroblock boundaries of a video image;
determining means for determining whether the one or more discontinuities include one or more artificial discontinuities and whether the one or more discontinuities include one or more real discontinuities; and
smoothing means for smoothing the one or more discontinuities in dependence on whether each discontinuity of the one or more discontinuities comprises an artificial discontinuity or a real discontinuity, wherein the smoothing means includes:
a visual adjustment means for visually adjusting each discontinuity that comprises a real discontinuity; and
a filter smoothing means for filter smoothing each discontinuity that comprises an artificial discontinuity with at least one smoothing filter comprising at least one of:
a tent filter; and
a Gaussian filter.

11. The arrangement as recited in claim 10, wherein the arrangement comprises a client device of a television-based entertainment environment.

12. The arrangement as recited in claim 10, wherein the detecting means utilizes a Laplacian of Gaussian (LoG) operation on the video image and the determining means utilizes the LoG operation on a quantization matrix.

13. The arrangement as recited in claim 12, wherein the determining means includes selecting means for selecting a discontinuity threshold from a plurality of results of the LoG operation on the quantization matrix.

14. The arrangement as recited in claim 12, wherein the quantization matrix comprises a scaled quantization matrix.

15. The arrangement as recited in claim 10, wherein the smoothing filter comprises a tent filter comprising:

$$T[n] = \begin{cases} 1 - \left|\frac{n}{5}\right| & -5 \le n \le 5 \\ 0 & \text{otherwise} \end{cases}$$

wherein n represents a group of pictures position number (GPN) of a macroblock containing the one or more discontinuities.

16. A client device for a television-based entertainment environment, the client device configured to perform actions comprising:
detecting, by the client device, one or more discontinuities at macroblock boundaries of a video image;
determining whether the one or more discontinuities include one or more artificial discontinuities and whether the one or more discontinuities include one or more real discontinuities by dividing a time-domain quantization matrix by two and passing a result through a Laplacian of Gaussian (LoG) filter to obtain a quantization noise value and identifying discontinuities with the quantization noise value above a threshold as one or more real discontinuities and identifying discontinuities with the quantization noise value below the threshold as artificial discontinuities;
smoothing the one or more artificial discontinuities using a filter smoothing procedure; and
smoothing the one or more real discontinuities using a visual adjustment procedure.

17. The client device as recited in claim 16, wherein the client device is further configured to detect the one or more discontinuities by applying a Laplacian of Gaussian (LoG) operation on the video image.

18. The client device as recited in claim 16, wherein selection of an optimum value for the threshold comprises experimental viewing of deblocked video.

19. The client device as recited in claim 16, wherein a value of the threshold comprises a value tunable subject to user preferences.

20. The client device as recited in claim 16, wherein the threshold is around 80 to 90 percent of a maximum absolute value of the quantization noise value.

* * * * *